United States Patent [19]

Hayden

[11] Patent Number: 5,352,370

[45] Date of Patent: Oct. 4, 1994

[54] METHOD FOR SO$_x$ REMOVAL BY CATALYTIC CARBON

[75] Inventor: Richard A. Hayden, Pittsburgh, Pa.

[73] Assignee: Calgon Carbon Corporation, Pittsburgh, Pa.

[21] Appl. No.: 8,722

[22] Filed: Jan. 21, 1993

[51] Int. Cl.$^5$ .................................................. C02F 1/72
[52] U.S. Cl. ..................................... 210/763; 95/137; 423/244.09
[58] Field of Search ........................... 95/137; 210/763; 423/244.09

[56] References Cited

U.S. PATENT DOCUMENTS

| | | | |
|---|---|---|---|
| 3,739,550 | 6/1973 | Martin et al. | 95/137 |
| 3,909,449 | 9/1975 | Nagai et al. | 252/422 |
| 4,624,937 | 11/1986 | Chau et al. | 502/180 |

FOREIGN PATENT DOCUMENTS

| | | | |
|---|---|---|---|
| 3620425 | 6/1987 | Fed. Rep. of Germany | B01J 21/18 |
| 4031968A1 | 4/1992 | Fed. Rep. of Germany | B01D 53/56 |
| 64-58331 | 4/1989 | Japan | B01D 53/36 |

OTHER PUBLICATIONS

J. Wang and W. Xie, "An Appraisal of the Surface Chemistry and the Catalytic Oxidative Activity of Nitrogen-Modified Activated Carbon by XPS," *Cuihua Xuebao* 10 (4), 357 (1989).

H. P. Boehm, A. R. de Rincon, T. Stohr, B. Tereczki, and A. Vass, "Activation of Carbon Catlysts for Oxidation Reactions by Treatment with Ammonia or Hydrogen Cyanide, and Possible Causes for the Loss of Activity During Catalytic Action," *Journal de Chemie Physique* 84, 449 (1987).

Y. Komatsubara, S. Ida, H. Fujitsu, and I. Mochida, "Catalytic Activity of PAN-Based Active Carbon Fibre (PAN-ACF) Activated with Sulphuric Acid for Reduction of Nitric Oxide with Ammonia," *Fuel* 63, 1738 (1984).

L. Singoredjo, F. Kapteijn, J. A. Moulijn, and J. M. Martin-Martinez, "Modified Activated Carbon for Low Temperature Selective Catalytic Reduction of NO with NH3," *20th Bien. Conf. on Carbon*, Jun. 23-28, 1991, p. 78.

W. Farmer and J. B. Firth, "The Catalytic Activity of Carbons from Aromatic Hydrocarbons and Somer Serivatives," *J. Phys. Chem.* 28, 1136 (1924).

P. F. Bente and J. H. Walton, "The Catalytic Activity of Activated Nitrogenous Carbons," *J. Phys. Chem.* 47, 133 (1943).

J. Watanabe and T. Shiramoto, "Activated Carbon Electrodes for Air-Depolarized Wet Cells III: The Decomposition of Hydrogen Peroxide by Activated Charcoal," *J. Electrochem. Soc. Japan* 20, 386 (1952).

E. Naruko, "Ammonia-Activated Charcoal," *Kogyo Kagaku Zasshi* 67 (12), 2023 (1964).

I. Mochida, Y. Masumura, T. Hirayama, H. Fujitsu, S. Kawano, and K. Gotoh, "Removal of SO2 in Flue Gas by Polyacrylonitrile Based Active Carbon Fiber (PAN-ACF)," *Nippon Kagaku Kaishi N4*, 269 (1991) abstract only.

A. Nishijima, H. Hagiwara, M. Kurita, A. Ueno, T. Sato, Y. Kiyosumi, and N. Todo, "Characterization of Nitrogen-Containing Active Carbon Catalysts for SO2 Removal," *Bull Chem. Soc. Japan* 55, 2618 (1982).

S. K. Naito, S. Takagi, H. Ebata, and S. Takei, "Activation of Carbon Catalysts for Oxidation of Iron (II) in Sulfuric Acid Solution by Oxygen," *Nippon Kagaku Kaishi* 4, 467 (1979).

I. Gavat, C. Costea, and A. Draganescu, "Catalytic Activity of Pyrolized Urea-Formaldehyde Polymers and of Some Melamine and Benzoguanamine Condensation Polymers with Substances Containing CO Groups," *Revue Roumaine de Chimie* 12, 1127 (1967).

K. Boki, S. Tanada, and T. Miyoshi, "Removal by Adsorption of Hydrogen Sulfide by a New Type of Activated Carbon Containing Nitrogen," *Nippon Eiseigaku Zasshi* 38(5), 877 (1983).

H. Sano and H. Ogawa, "Preparation and Application of N-Introduced Carbon II: Application for Removal of Sulfur Oxides from Flue Gas," *Osako Kogy Gijutsu Shikenjo Koho* 26, 92 (1975).

K. Boki, S. Tanada, T. Kita, T. Nakamura, H. Takahashi, and R. Hamada, "Increase in Micropore Volume of N-Containing Activated Carbon Treated with Methylol Melamine Urea Solution," *Experientia* 39, 143 (1983).

S. Tanada, T. Kita, K. Boki, and Y. Kozaki, "Preparation of Narrow Pores Carbon Suitable for Hydrogen (List continued on next page.)

*Primary Examiner*—Ivars Cintins
*Attorney, Agent, or Firm*—Cindrich & Titus

[57] ABSTRACT

An improved process is for the removal of sulfur oxides from gas or liquid media containing oxygen and water by contacting said media with a catalytically-active carbonaceous char. The improvement is provided by the use of a catalytically-active carbonaceous char prepared by low-temperature carbonization and oxidation of a bituminous coal or bituminous coal-like material followed by exposure to a nitrogen-containing compound during the initial high-temperature exposure of the low-temperature oxidized char. Following this initial high-temperature treatment the material can be further calcined or activated as desired.

6 Claims, No Drawings

OTHER PUBLICATIONS

Sulfide Asorption," *J. Environ. Sci. Health A20* (1), 87 (1985).

B. Stohr, H. P. Boehm, and R. Schlogl, "Enhancement of the Catalytic Activity of Activated Carbons in Oxidation Reactions by Thermal Treatment with Ammonia or Hydrogen Cyanide and Observation of Superoxide Species as a Possible Intermediate," *Carbon* 29(6), 707 (1991).

M. Zuckmantel, R. Kurth, and H. P. Boehm, "Carbons as Catalytic Agents for the Oxidation of Sulfurous Acid," *Z. Naturforsch. 34b*, 188 (1979).

Y. Maki, "Relation Between Performances of the Air–depolarized Cell and Catalytic Activity of Charcoals," *J. Electrochem. Soc. Japan* (Overseas Ed.), 2w7, No. 4–6 E 115 (1959).

R. Manoharan, A. K. Shukla, "Oxygen-Reducing Porous Carbon Electrode for Electrochemical Power Sources with Alakline Electrolytes," *Journal of Power Sources*, 10 (1983) 333–341.

D. M. Drazic and R. R. Adzic, "Influence of Surface Treatment of Active Carbon on Its Activity in Fuel Cell Electrodes," *Flasnik Hemijskog Drustva Beograd,* 349 (2–4) 203(10) (1969) CA 73 (26):136627.

METHOD FOR $SO_x$ REMOVAL BY CATALYTIC CARBON

FIELD OF THE INVENTION

The present invention relates to the use of a highly catalytic carbonaceous material for the removal of sulfur oxides from gas or liquid media containing oxygen and water.

BACKGROUND OF THE INVENTION

As restrictions on the emission of acid rain precursors such as sulfur dioxide have grown in recent years, a corresponding need has arisen for technologies capable of removing such compounds from gaseous streams in which they are present. Examples of such gaseous streams include flue gases from incinerators and fossil-fueled power plants. It is well known to use activated carbons and cokes for the removal of sulfur dioxide from such streams, especially above 100 C. Below 100 C. and in the presence of oxygen and water, carbonaceous chars can act as catalysts for the oxidation of sulfur dioxide to sulfuric acid. However, the rate of reaction is usually so low that the loadings and concentrations of sulfuric acid which accumulate on the char are rarely of commercial interest.

The use of carbonaceous char catalysts treated with nitrogen-containing compounds during their manufacture or prepared from nitrogen-rich starting materials have shown particular promise in this application. For example, improvements in the rate of oxidation of sulfur (IV) to sulfur (VI) have been achieved in the liquid phase using high-temperature, nitrogen-poor carbonaceous chars which are post-calcined in the presence of ammonia or other nitrogen-containing substances. Improved direct gas phase oxidation of sulfur dioxide has been achieved for high temperature nitrogen-poor chars post-calcined in presence of melamine or its derivatives. Other carbonaceous chars have been used for the enhanced liquid-phase and gas-phase oxidation of sulfur (IV). These carbonaceous chars were derived from nitrogen-rich starting materials such as polyacrylonitrile. Also, a char suitable for the catalytic oxidation of sulfur (IV) has been produced wherein a high-temperature nitrogen-poor activated carbon or coke was oxidized by sulfur (VI) and exposed to a nitrogen-containing ammonia salt at temperatures above 350 C.

All of the prior art methods for improving the inherent catalytic capabilities of carbonaceous materials for sulfur (IV) oxidation have certain disadvantages which limit their overall utility. For example, almost all use high-temperature chars as starting materials. High-temperature carbonaceous chars are those produced by thermal treatment at temperatures greater than 700 C. Low-temperature chars have not experienced temperatures greater than 700 C. Since high-temperature carbonaceous chars are fairy inert chemically, the use of aggressive chemical post-treatments is usually required to effect significant changes in their catalytic capabilities. One exception is the use of an expensive synthetic starting material such as polyacrylonitrile. However, this is also disadvantageous. Additionally, the use of high-temperature finished chars as starting materials is inevitably more expensive than the direct use of the raw materials from which they are made. In some cases large quantities of toxic process byproducts such as sulfur dioxide and cyanide are unavoidably produced, while others require the use of highly hazardous treatment agents such as sulfuric acid.

Accordingly, it is the object of the present invention to provide an improved process for the removal of sulfur oxides from gas or liquid media containing oxygen and water at temperatures below 100 C. using a carbonaceous char catalyst prepared directly from a nitrogen-poor, naturally-occurring starting material such as a bituminous coal or a bituminous coal-like material. It is further the object of the present invention to limit the use of agents responsible for imparting catalytic activity to the carbonaceous char by performing the essential treatments during the low-temperature (less than 700 C.) transition of the starting material to the final product. These treatments include low-temperature (less than 700 C.) oxidation of the starting material to produce a low-temperature oxidized char, preferably by inexpensive, abundant, relatively non-toxic oxidants such as air, and exposure of the oxidized low-temperature char to nitrogen-containing compounds during, not after, calcination and condensation of the carbon structure. The preferred nitrogen-containing compounds are inexpensive, abundant, and relatively non-toxic agents such as urea or melamine but other nitrogen-containing compounds may also be used. By this method, carbonaceous chars with high catalytic activity per se for the oxidation of sulfur (IV) in the presence of oxygen and water can be produced with minimal departure from conventional processes for the production of high-temperature carbonaceous chars such as activated carbons and cokes.

SUMMARY OF THE INVENTION

Generally, the present invention comprises the removal of sulfur (IV) from media containing oxygen and water by the catalytic action of carbonaceous chars. The catalytic carbonaceous chars are prepared by the low-temperature (less than 700 C.) carbonization and oxidation of a nitrogen-poor feedstock, followed by exposure of the oxidized low-temperature char to a nitrogen-containing compound at high-temperatures (greater than 700 C.) during the initial calcination or calcination/activation.

The preferred nitrogen-poor feedstock is a bituminous coal or a bituminous coal-like material such as those derived from higher or lower rank bitumens, coals, or lignocellulose materials by various chemical treatments. Examples of higher rank coals include anthracite or semi-anthracite coals, while examples of lower rank coals include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to lignocellulose materials.

In a preferred embodiment of this invention, the feedstock material is pulverized, mixed if necessary with small amounts of a suitable binder, such as pitch, briquetted or otherwise formed, and sized. The sized material is then extensively oxidized at temperatures less than 700 C., preferably less than 400 C. The oxidation is continued until additional gains in the catalytic activity of the final product are no longer evident. The oxidation is well beyond that typically required to remove the coking properties of bituminous coals and produces an optimally oxidized carbonaceous char. Other convenient means of oxidation can also be used to effect the low-temperature oxidation and carbonization of the starting material.

The oxidized low-temperature carbonaceous char is then exposed to small amounts of an inexpensive, abundant, and relatively non-toxic nitrogen-containing compound such as urea during, not after, the initial calcination and condensation of the carbon structure. The amounts of nitrogen-containing compounds used are typically small, preferably less than 5% by weight of the oxidized low-temperature char or such that additional gains in the catalytic activity of the final product are no longer evident. The treatment is carried out by heating the oxidized low-temperature carbonaceous char to high temperatures, preferably between 850 C. and 950 C., in the presence of the nitrogen-containing compound. This heating is preferably conducted under an atmosphere that is inert except for the gases and vapors attributable to the carbonaceous char and/or the nitrogen-containing compound. The heating rate and temperatures are preferably selected such that additional gains in the catalytic activity of the final product are no longer evident. The nitrogen-treated high-temperature carbonaceous char may then be activated to the desired density at temperatures above 700 C. in steam and/or carbon dioxide, with or without the addition of other gasifying agents such as air. The calcined or calcined/activated carbonaceous char is then cooled in an oxygen-free or otherwise inert atmosphere to temperatures less than 400 C., preferably less than 200 C. Additional gains in catalytic activity may be realized by repeating the oxidation/exposure to nitrogen-containing compounds/calcination or calcination/activation/inert cooling as many times as may be desired. Alternatively, any other method known to generate catalytic activity in high temperature chars may be applied to the resultant product to further enhance its catalytic activity.

The catalytically-active carbonaceous char so prepared is then contacted with a sulfur (IV)-containing media, in particular a sulfur dioxide-containing stream, in the presence of water and oxygen. Sulfur (IV) is removed from the stream by catalytic oxidation primarily to sulfur (VI), particularly to sulfuric acid.

PRESENTLY PREFERRED EMBODIMENTS

The utility of the invention is illustrated by the following two examples. Example 1 demonstrates the $SO_2$ removal capability of a commercial activated carbon of the prior art. Example 2 demonstrates the $SO_2$ removal capability of the present invention. Comparison of these two examples shows that the performance of the present invention greatly exceeds that of a typical activated carbon.

EXAMPLE 1

A commercially available activated carbon, BPL (manufactured by Calgon Carbon Corporation, Pittsburgh Pa.) was crushed and sized to less than 14 mesh and greater than 20 mesh. The sized carbon was placed into a column having an inside diameter of 18 mm to a bed depth of 76 mm. At ambient pressure and temperature, a humidified gas stream was passed through this column at a flow rate of 1000 cc per minute. The composition of the gas stream on a dry basis was nominally 500 ppmv $SO_2$, and 500 ppmv $O_2$ with the balance as $N_2$. This dry stream was humidified to between 50% and 80% relative humidity prior to its introduction into the carbon-containing column. The column effluent was monitored and the elapsed time required to achieve a 10 to 15 ppmv $SO_2$ breakthrough was determined. This sample of commercially available activated carbon achieved breakthrough in approximately 4 hours.

EXAMPLE 2

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100 C. to 200 C. at a rate of 200 C. per hour, then from 200 C. to 350 C. at a rate of 100 C. per hour, then held at 350 C. for 5 hours, and finally heated from 350 C. to 450 C. at a rate of 100 C. per hour. The resultant oxidized material was cooled to near ambient temperatures in a low oxygen content atmosphere, sized to produce an approximately less than 4 and greater than 6 mesh size (U.S. Standard Series sieves) material, and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950 C. under an inert gas atmosphere and maintained at that temperature for 1 hour. Immediately following this calcination treatment the resultant material was activated with steam at 950 C. After activation, the material was cooled to ambient temperature under an inert atmosphere. The catalytically-active activated carbonaceous char so produced, when sized to less than 4 mesh (U.S. Standard Series Sieves) and greater than 6 mesh (U.S. Standard Series Sieves) exhibited an Apparent Density (Test Method TM-7, Calgon Carbon Company, Pittsburgh Pa.) of 0.480 grams per cc.

The catalytically-active activated carbonaceous char prepared as described above was crushed and a less than 14 mesh and greater than 20 mesh sized portion of this sample was evaluated for $SO_2$ removal in a manner identical to that described in Example 1. The column effluent was monitored and the elapsed time required to achieve a 10 to 15 ppmv breakthrough determined. This sample of catalytically-active activated carbonaceous char achieved breakthrough in approximately 15 hours.

While the presently preferred embodiment of the invention has been described, it may be otherwise embodied within the scope of the appended claims.

What is claimed is:

1. A process for the removal of sulfur oxides from gaseous or liquid media which process comprises contacting said media, in the presence of oxygen and water vapor at temperatures below 100° C., with a catalytically-active carbonaceous char, said carbonaceous char comprising a bituminous coal or bituminous coal-like material carbonized and oxidized at temperatures below 700° C., and thereafter contacted with nitrogen-containing compounds while the temperatures were increased above 700° C.

2. The process of claim 1 wherein said carbonaceous char is activated at temperatures above 700° C. using at least one of $H_2O$, carbon dioxide, and oxygen.

3. The process of claim 2 wherein the activated carbonaceous char is cooled, following activation, to temperatures less than 400° C. in an oxygen-free or otherwise inert atmosphere.

4. The process of claim 2 wherein the activated carbonaceous char is cooled, following activation, to temperatures less than 200° C. in an oxygen-free or otherwise inert atmosphere.

5. The process of claim 1 wherein said carbonaceous char is cooled, after contact with nitrogen-containing compounds at temperatures above 700° C., to temperatures less than 400° C. in an oxygen-free or otherwise inert atmosphere.

6. The process of claim 1 wherein said carbonaceous char is cooled after contact with nitrogen-containing compounds at temperatures above 700 C., to temperatures less than 200° C. in an oxygen-free or otherwise inert atmosphere.

* * * * *